(12) United States Patent
Chang

(10) Patent No.: US 7,946,721 B2
(45) Date of Patent: May 24, 2011

(54) BACKLIGHT MODULE

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 272 days.

(21) Appl. No.: 12/327,901

(22) Filed: Dec. 4, 2008

(65) Prior Publication Data

US 2009/0296373 A1 Dec. 3, 2009

(30) Foreign Application Priority Data

May 30, 2008 (CN) .......................... 2008 1 0301866

(51) Int. Cl.
*G09F 13/08* (2006.01)

(52) U.S. Cl. ............... 362/97.1; 362/97.2; 362/97.3; 362/608; 362/615; 362/616

(58) Field of Classification Search .................. 362/608, 362/612, 613, 615, 616, 97.1, 97.2, 97.3
See application file for complete search history.

(56) References Cited

U.S. PATENT DOCUMENTS

| | | | |
|---|---|---|---|
| 7,543,972 B2 * | 6/2009 | Huang et al. | 362/616 |
| 2005/0180124 A1 * | 8/2005 | Adachi et al. | 362/30 |
| 2010/0253881 A1 * | 10/2010 | Han et al. | 349/65 |

* cited by examiner

*Primary Examiner* — Stephen F Husar
*Assistant Examiner* — James W Cranson
(74) *Attorney, Agent, or Firm* — Clifford O. Chi

(57) ABSTRACT

An exemplary backlight module includes a base plate, a plurality of light guide plates and a plurality of light sources. The light guide plates are juxtaposed and attached on the base plate. The light guide plates are optically isolated from each other. The light sources are disposed adjacent the respective light guide plates.

18 Claims, 6 Drawing Sheets

BACKLIGHT MODULE

BACKGROUND

1. Technical Field

The present invention relates to backlight modules, and particularly to backlight modules used in large size display devices for example, liquid crystal display devices.

2. Discussion of Related Art

In a liquid crystal display device, liquid crystal is a substance that does not itself radiate light. Instead, the liquid crystal relies on receiving light from a light source, thereby displaying images and data. In the case of a typical liquid crystal display device, a backlight module powered by electricity acts as the light source to supply the needed light.

Backlight modules generally include a light guide plate and at least one light source. The larger the liquid crystal display device is, the larger the light guide plate needs to be. However, the large light guide plate requires large mold and molding machine for production. The difficulty of the latter process will also increase.

Therefore, a new backlight module is desired to overcome the shortcomings described above.

BRIEF DESCRIPTION OF THE DRAWINGS

Many aspects of the present backlight modules can be better understood with reference to the following drawings. The components in the drawings are not necessarily to scale, the emphasis instead being placed upon clearly illustrating the principles of the present backlight modules. Moreover, in the drawings, like reference numerals designate corresponding parts throughout the several views.

DETAILED DESCRIPTION OF EMBODIMENTS

Reference will now be made to the drawings to describe in detail of the exemplary embodiments of the backlight module.

Figure 1:
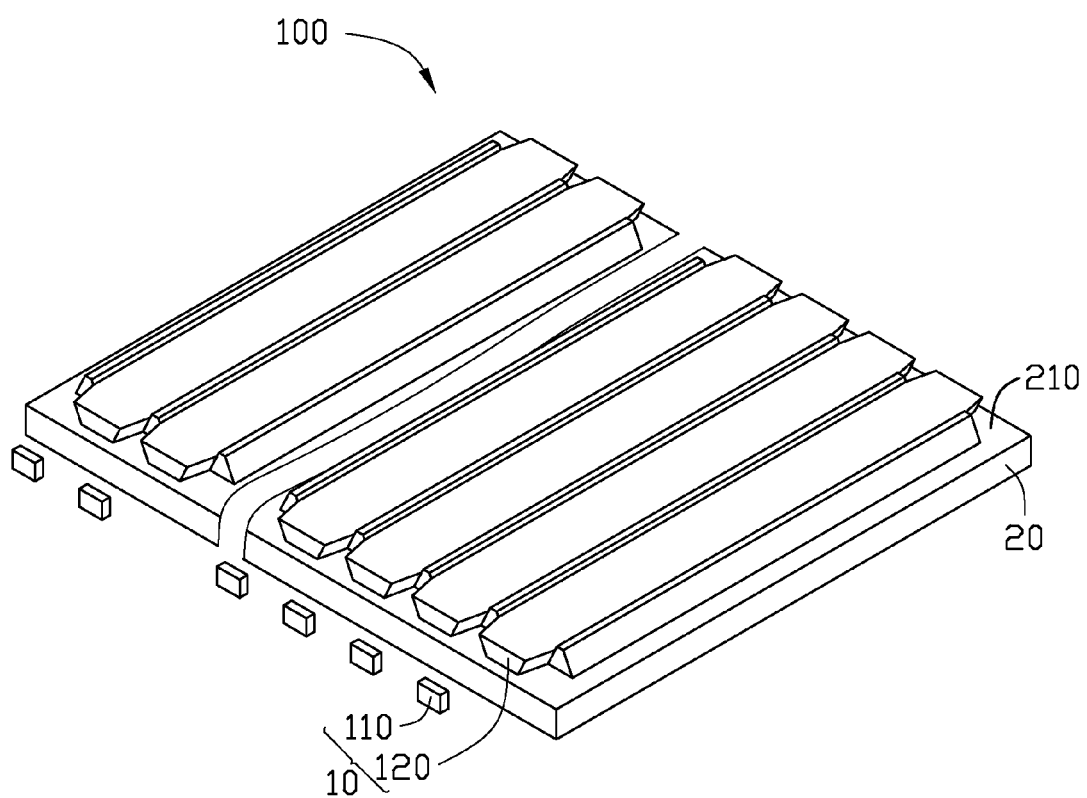
FIG. 1 is a schematic, isometric view of a backlight module in accordance with a first embodiment.

Referring to FIG. 1, a backlight module 100, in accordance with the first embodiment, includes a plurality of backlight units 10 and a base plate 20. The base plate 20 includes a reflecting surface 210.

Figure 2:
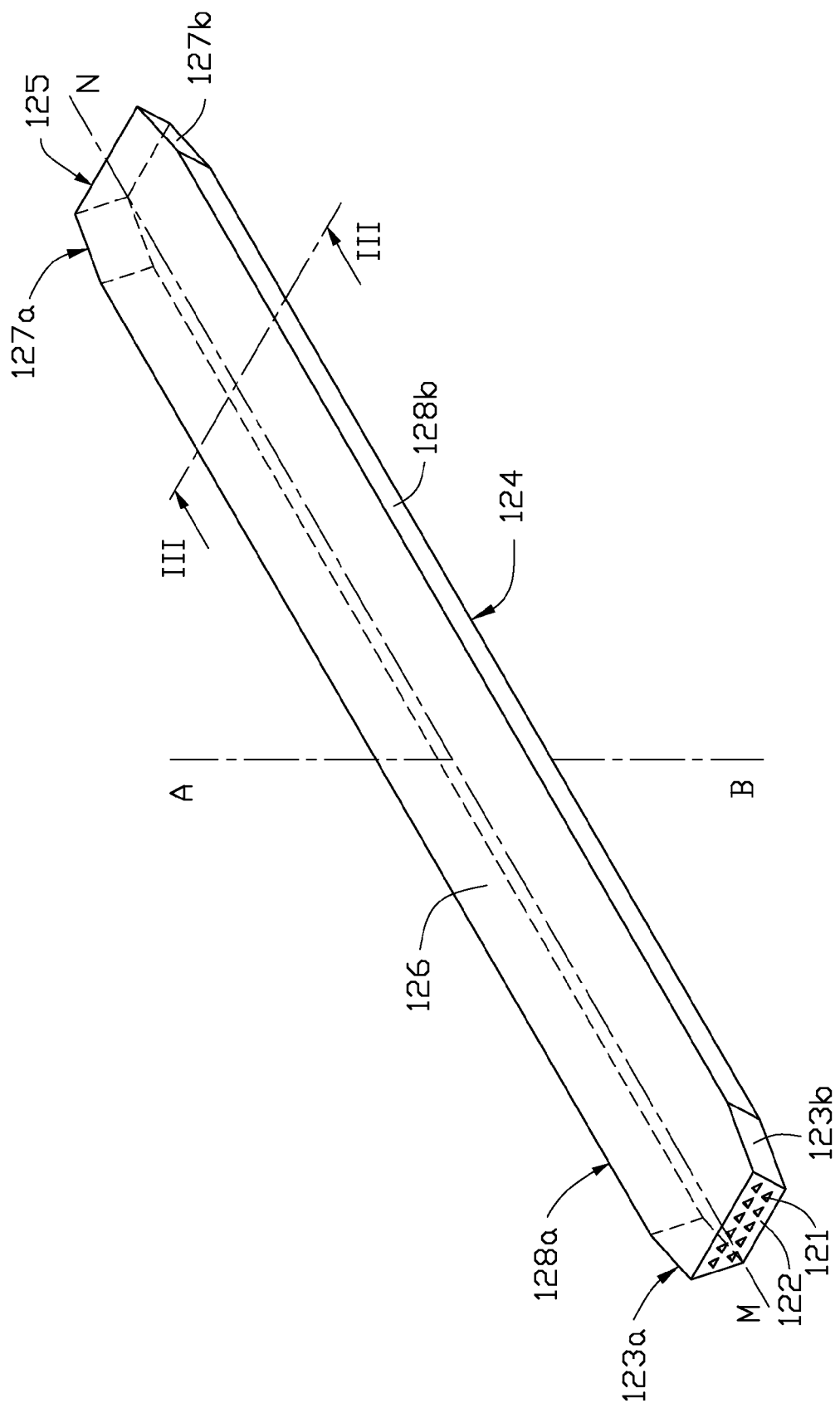
FIG. 2 is a schematic, isometric view of a light guide plate of the backlight module in FIG. 1.

Each backlight unit 10 includes a light source 110 and a light guide plate 120 position adjacent to the light source 110. The light guide plates 120 are juxtaposed and attached on the reflecting surface 210 of the base plate 20. The light sources 110 are disposed adjacent the respective light guide plates 120. In the present embodiment, the light sources 110 are light-emitting diodes (LEDs). The light sources 110 emit light beams with various colors referring to a controlling signal. Referring to FIG. 2, each light guide plate 120 includes a light incident surface 122 opposite to the corresponding light source 110, a bottom surface 124, a light-emitting surface 126 opposite to the bottom surface 124, a first reflecting surface 123a, a second reflecting surface 123b, a third reflecting surface 125, a fourth reflecting surface 127a, a fifth reflecting surface 127b, a first side surface 128a and a second side surface 128b opposite to the first side surface 128a. The light guide plates 120 include light-emitting surfaces 126 facing away from the reflecting surface 210. The light-emitting surfaces 126 of the light guide plates 120 are substantially coplanar.

Figure 3:
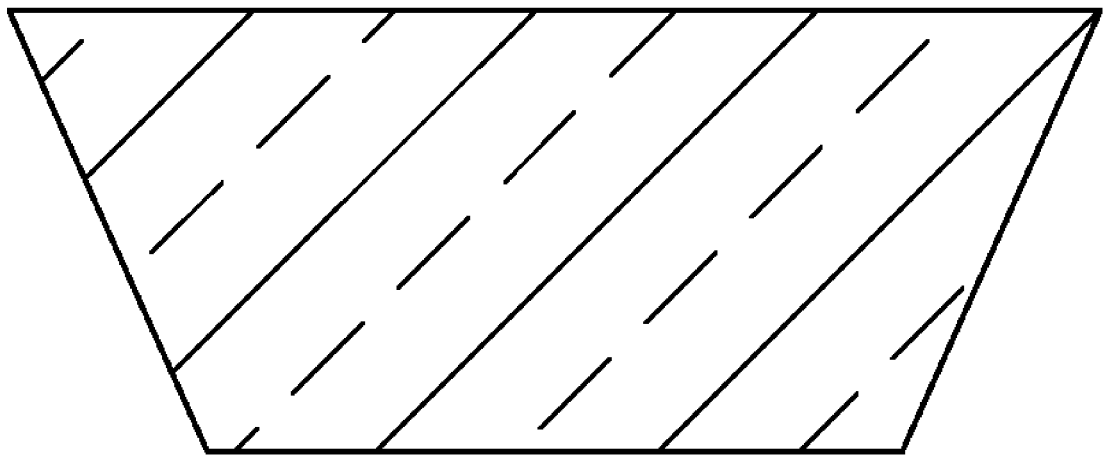
FIG. 3 is a schematic, cross-sectional view taken along the line III-III of the light guide plate in FIG. 2.

Each of the light guide plates 120 includes a light input end with the light incident surface 122 facing toward the corresponding light source 110. The light input end tapers toward the corresponding light source 110. The light incident surface 122 has a plurality of triangular recesses 121 defined therein. The recesses 121 are opposite to the light source 110. The light beams emitted from the light source 110 enter the light guide plate 120 from the light incident surface 122, and are scattered by the recesses 121, so as to eliminate dark strips. The first and the second side surfaces 128a, 128b are rectangular. That is to say, the light guide plate 120 is flat. The light incident surface 122 is connected between the bottom surface 124 and the light-emitting surface 126. The first light reflecting surface 123a is connected with the first side surface 128a, the light incident surface 122, the light-emitting surface 126 and the bottom surface 124. The second light reflecting surface 123b is connected with the second side surface 128b, the light incident surface 122, the light-emitting surface 126 and the bottom surface 124. The third reflecting surface 125 locates opposite to the light incident surface 122, and is connected between the light-emitting surface 126 and the bottom surface 124. The fourth reflecting surface 127a is connected with the first side surface 128a, the light-emitting surface 126 and the bottom surface 124 and the third light reflecting surface 125. The fifth reflecting surface 127b is connected with the second side surface 128b, the light-emitting surface 126 and the bottom surface 124 and the third light reflecting surface 125. The third light reflecting surface 125 is located between the fourth light reflecting surface 127a and the fifth light reflecting surface 127b. A central line MN of the light guide plate 120 is perpendicular to the light incident surface 122. A central line AB of the light guide plate 120 is perpendicular to the light-emitting surface 126. Along the direction of the central line MN, the first and the second light reflecting surfaces 123a, 123b are inclined away from the central line MN, and the fourth and the fifth light reflecting surfaces 127a, 127b are inclined close to the central line MN. Along the direction of the central line AB, the first and the second side surfaces 128a, 128b are inclined close to the central line AB. Therefore, the shape of the cross-section of the light guide plate 120, along the direction of perpendicular to the light-emitting surface 126 and parallel to the light incident surface 122, is inverse trapezoidal (see FIG. 3). That is to say, each of the light guide plates 120 tapers in a direction toward the reflecting surface 210.

It should be understood that the shape of the recesses 121 is not limited to triangular. It also could be V-shape, U-shape or other shapes, as long as the light beams emitted from the light source 110 enter the light guide plate 120 and are scattered by the recesses 121.

Figure 4:
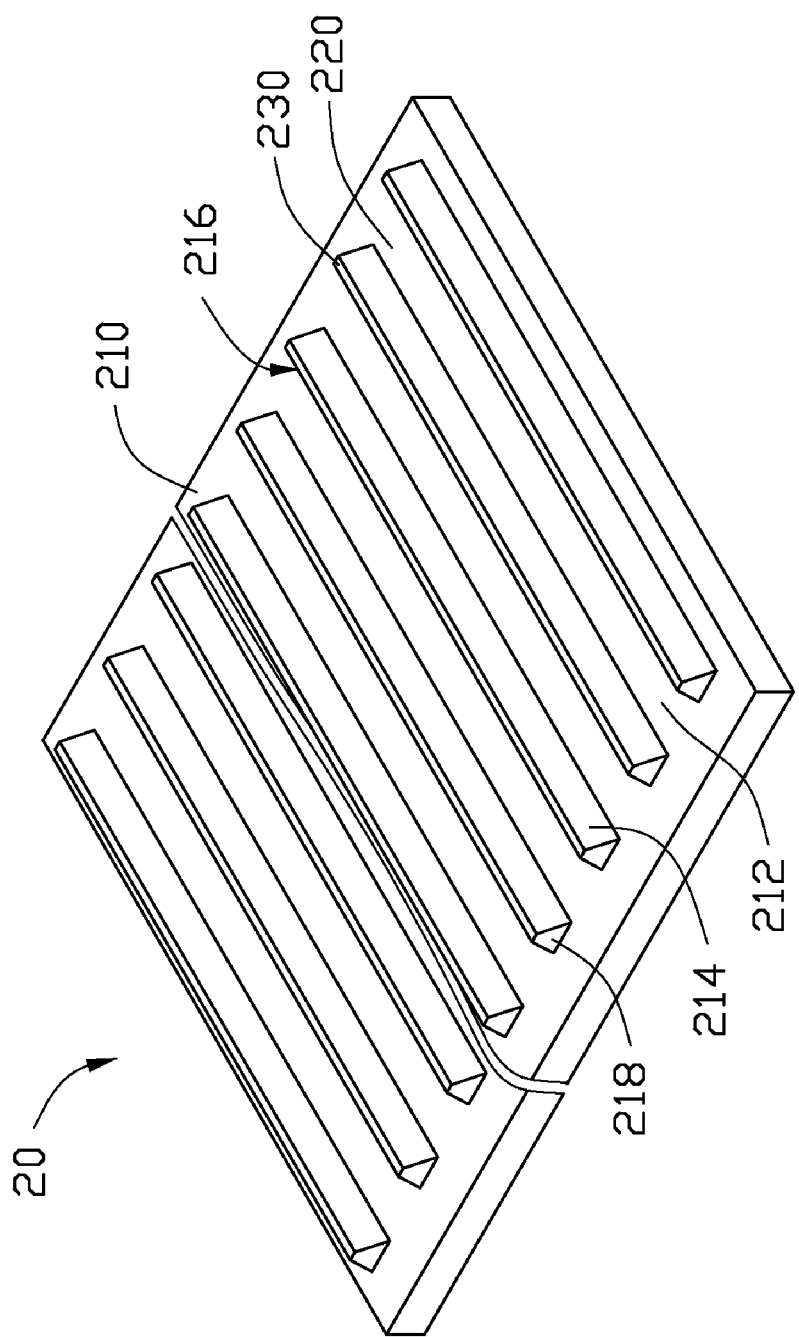
FIG. 4 is a schematic, isometric view of the base plate of the backlight module in FIG. 1.

Referring to FIG. 4, the base plate 20 has a plurality of receiving spaces 220 defined therein corresponding with the plurality of light guide plates 120 (see FIG. 2). Each receiving space 220 is formed by a bottom surface 212, a first side surface 214 and a second side surface 216 opposite to the first side surface 212. A trapezoidal protrusion 230 is located between each two receiving spaces 220. The plurality of protrusions 230 are provided on the base plate 20 spacing the light guide plates 120 from each other. Each partitioning protrusions 230 tapers in a direction away from the base plate 20.

Referring to FIGS. 1, 2 and 4, the bottom surface 124 of each light guide plate 120 is adhered to the bottom surface 212 of each receiving space 220. The first side surface 128a of each light guide plate 120 is adhered to the first side surface 214 of each receiving space 220. The second side surface 128b of each light guide plate 120 is adhered to the second side surface 216 of each receiving space 220. Accordingly, each light guide plate 120 is tightly received in each receiving space 220. In the present embodiment, the base plate 20 is made of plastic material with a highly reflecting film thereon, so when each light source 110 illuminates light beams with different colors correspondingly with the controlling signal, the light beams with different colors are not coupled to other light guide plates which are not opposite to the light source 110.

It should be understood that it is not necessary for the base plate 20 being made of plastic material with highly reflective film thereon. The receiving space 220 may be coated by a high reflecting film. That is to say, the bottom surface 212, the first and the second side surfaces 214, 216 may be coated by high reflecting films. Otherwise, the associated light guide plates 120 include reflecting surfaces.

Referring to FIGS. 1, 2 and 4, in assembly, firstly, the bottom surface 124 of each light guide plate 120 is adhered to the bottom surface 212 of each receiving space 220, the first side surface 128a of each light guide plate 120 is adhered to the first side surface 214 of each receiving space 220, and the second side surface 128b of each light guide plate 120 is adhered to the second side surface 216 of each receiving space 220. Accordingly, each light guide plate 120 is tightly received in each receiving space 220. The light guide plates 120 are optically isolated from each other. Secondly, each light source 110 is arranged in one-to-one correspondence with each light guide plate 120 on a baseboard (not shown).

In use, the light beams emitted from the light source 110 firstly enter the light guide plate 120 from the light incident surface 122, then go through from the bottom surface 124, the first light reflecting surface 123a, the second light reflecting surface 123b, the third light reflecting surface 125, the fourth light reflecting surface 127a, the fifth light reflecting surface 127b, the first side surface 128a, the second side surface 128b, and finally exit out from the light-emitting surface 126.

Figure 5:
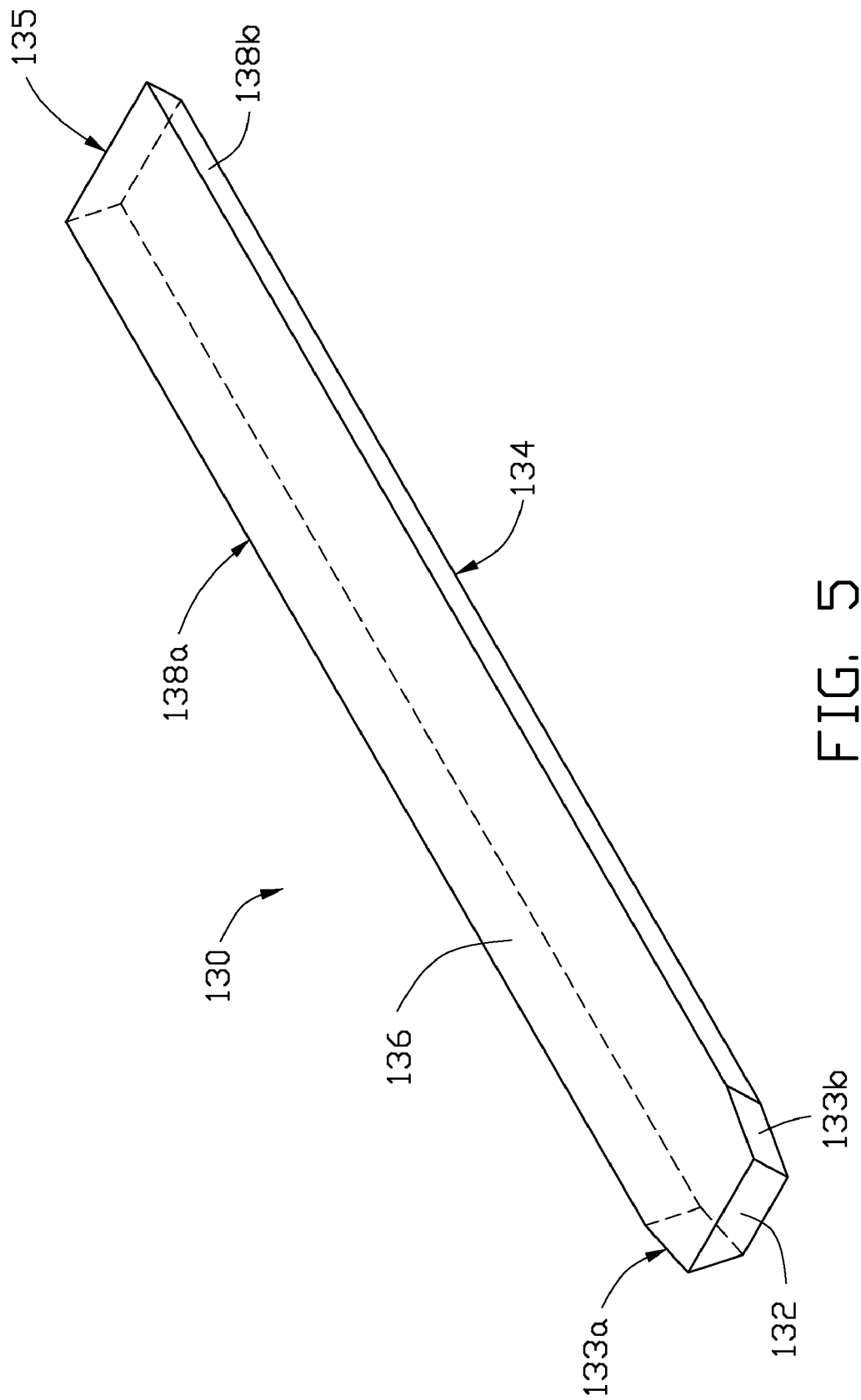
FIG. 5 is a schematic, isometric view of a light guide plate of a backlight module in accordance with a second embodiment.

Referring to FIG. 5, a backlight module (not shown), in accordance with the second embodiment, is almost uniform with the backlight module 100 of the first embodiment. The difference is on the structure of the light guide plate. In the present embodiment, the light guide plate 130 includes a light incident surface 132 opposite to the light source (not shown), a bottom surface 134, a light-emitting surface 136 opposite to the bottom surface 134, a first light reflecting surface 133a, a second light reflecting surface 133b, a third light reflecting surface 135, a first side surface 138a and a second side surface 138b opposite to the first side surface 138a. The third reflecting surface 135 is connected with the first side surface 138a and the second side surface 138b.

Figure 6:
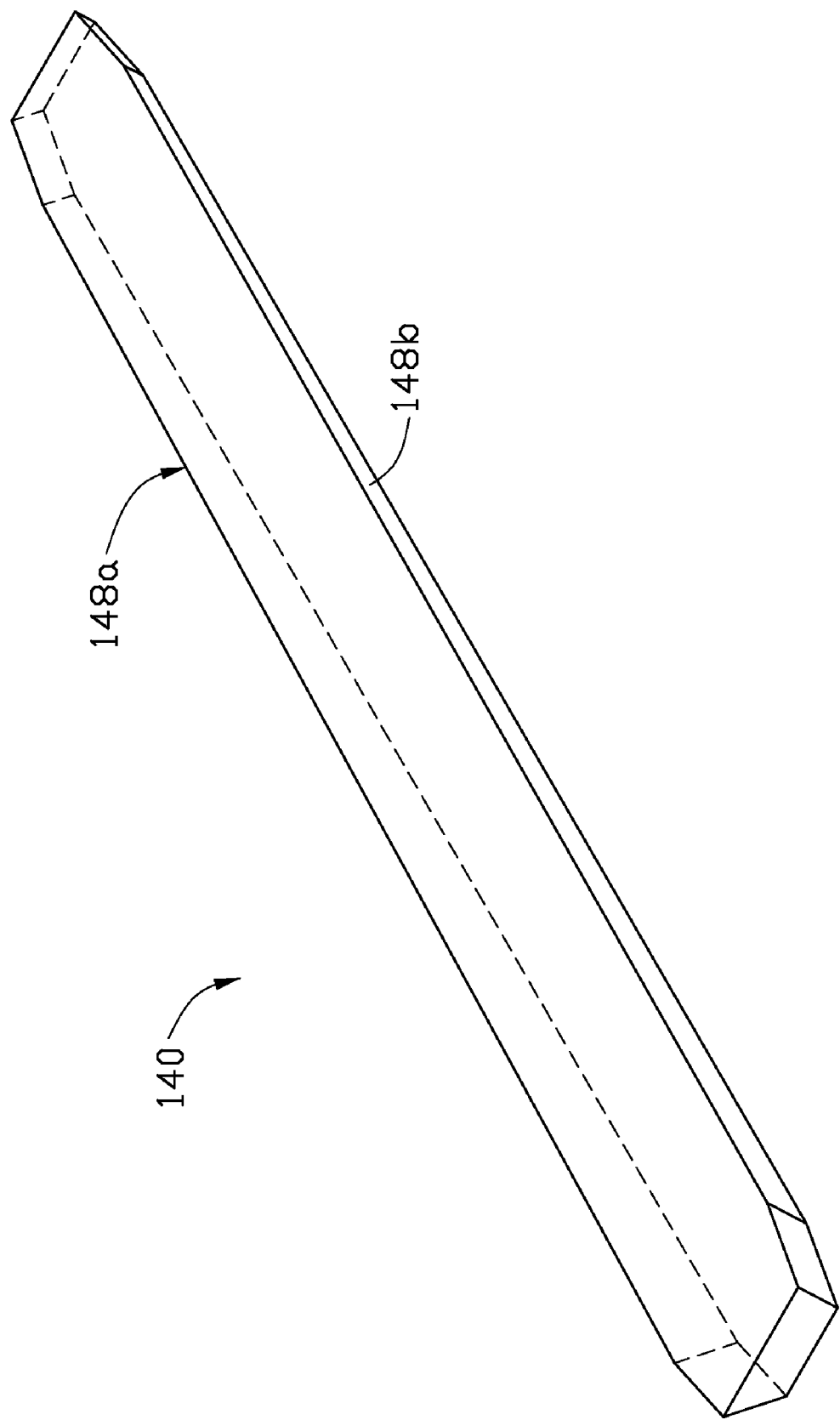
FIG. 6 is a schematic, isometric view of a light guide plate of a backlight module in accordance with a third embodiment.

Referring to FIG. 6, a backlight module (not shown), in accordance with the third embodiment of the present invention, is almost uniform with the backlight module 100 of the first embodiment. The difference is on the shape of the light guide plate. In the present embodiment, the light guide plate 140 includes a first side surface 148a and a second side surface 148b. The shape of the first and the second side surfaces 148a, 148b is trapezoidal. Namely, the light guide plate 140 is a wedge-shaped sheet.

Backlight modules in the present invention utilize a plurality of light guide plates received in the receiving spaces on the base plate, so to meet the necessary of the large back modules of the large liquid crystal display devices, avoid using large mold and larger molding machine, and the difficulty of latter process also will be reduced.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A backlight module comprising:
a base plate comprising a reflecting surface;
a plurality of juxtaposed light guide plates being attached on the reflecting surface, the light guide plates being optically isolated from each other;
a plurality of light sources being disposed adjacent the respective light guide plates; and
a plurality of partitioning protrusions provided on the base plate spacing the light guide plates from each other;
wherein each of the light guide plates tapers in a direction toward the reflecting surface.

2. The backlight module of claim 1, wherein the partitioning protrusions taper in a direction away from the base plate.

3. The backlight module of claim 1, wherein the light guide plates comprise light emitting surfaces facing away from the reflecting surface, the light emitting surfaces being substantially coplanar.

4. The backlight module of claim 1, wherein each of the light guide plates comprises a light input end with a light incident surface facing toward the corresponding light source, the light input end tapering toward the corresponding light source.

5. The backlight module of claim 2, wherein at least one of the protrusions and the associated light guide plates includes reflecting surfaces at interfaces therebetween.

6. The backlight module of claim 1, wherein the light sources comprise a first light source for emitting light of a first color and a second light source for emitting light of a second color different from the first color.

7. The backlight module of claim 1, wherein the light source includes a light-emitting diode.

8. The backlight module of claim 1, wherein each light guide plate comprises a plurality of recesses in the light incident surface thereof.

9. The backlight module of claim 1, wherein the base plate is made of plastic material.

10. The backlight module of claim 1, wherein the light guide plate is a flat sheet or a wedge-shaped sheet.

11. A backlight module comprising:
a base plate;
a plurality of juxtaposed light guide plates being attached on the base plate, the light guide plates being optically isolated from each other;
a plurality of light sources being disposed adjacent the respective light guide plates; and
a plurality of partitioning protrusions provided on the base plate spacing the light guide plates from each other.

12. The backlight module of claim 11, wherein the base plate comprises a reflecting surface, and the light guide plates are attached on the reflecting surface.

13. The backlight module of claim 12, wherein each of the light guide plates tapers in a direction toward the reflecting surface.

14. The backlight module of claim 12, wherein the light guide plates comprises light emitting surfaces facing away from the reflecting surface, the light emitting surfaces being substantially coplanar.

15. The backlight module of claim 11, wherein the partitioning protrusions taper in a direction away from the base plate.

16. The backlight module of claim 11, wherein at least one of the protrusions and the associated light guide plates includes reflecting surfaces at interfaces therebetween.

17. The backlight module of claim 11, wherein each light guide plate comprises a bottom surface being contacted with the base plate, and the bottom surface comprises a reflecting film.

18. A backlight module comprising:
a base plate comprising a reflecting surface;
a plurality of juxtaposed light guide plates being attached on the reflecting surface, the light guide plates being optically isolated from each other; and
a plurality of light sources being disposed adjacent the respective light guide plates;
wherein each of the light guide plates comprises a light input end with a light incident surface facing toward the corresponding light source, the light input end tapering toward the corresponding light source.

* * * * *